A. O. ABBOTT, Jr.
TIRE LOOSENING MACHINE.
APPLICATION FILED APR. 22, 1920.
1,384,419.
Patented July 12, 1921.
4 SHEETS—SHEET 4.
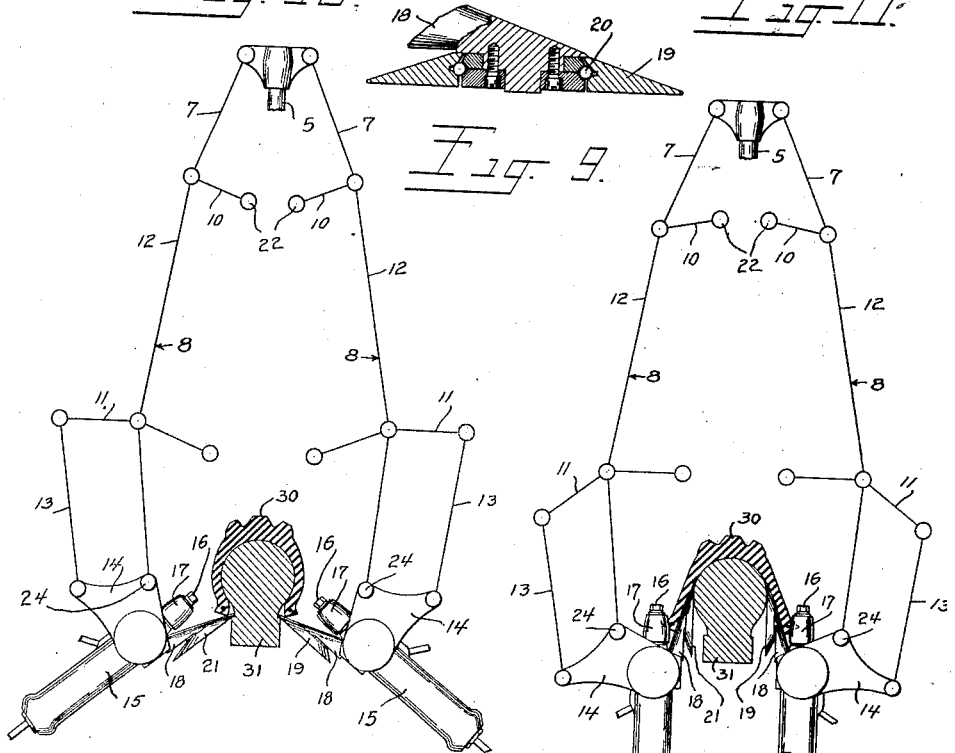
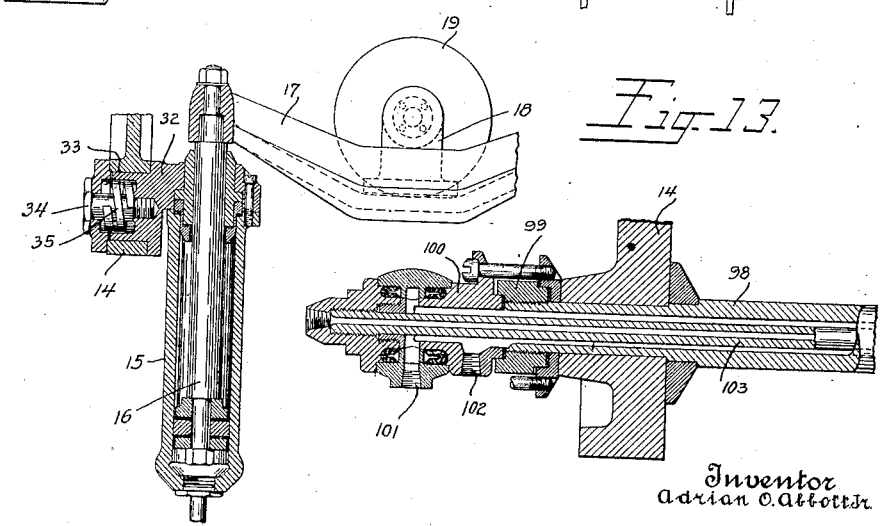
Inventor
Adrian O. Abbott Jr.
By his Attorney
Ernest Hopkinson

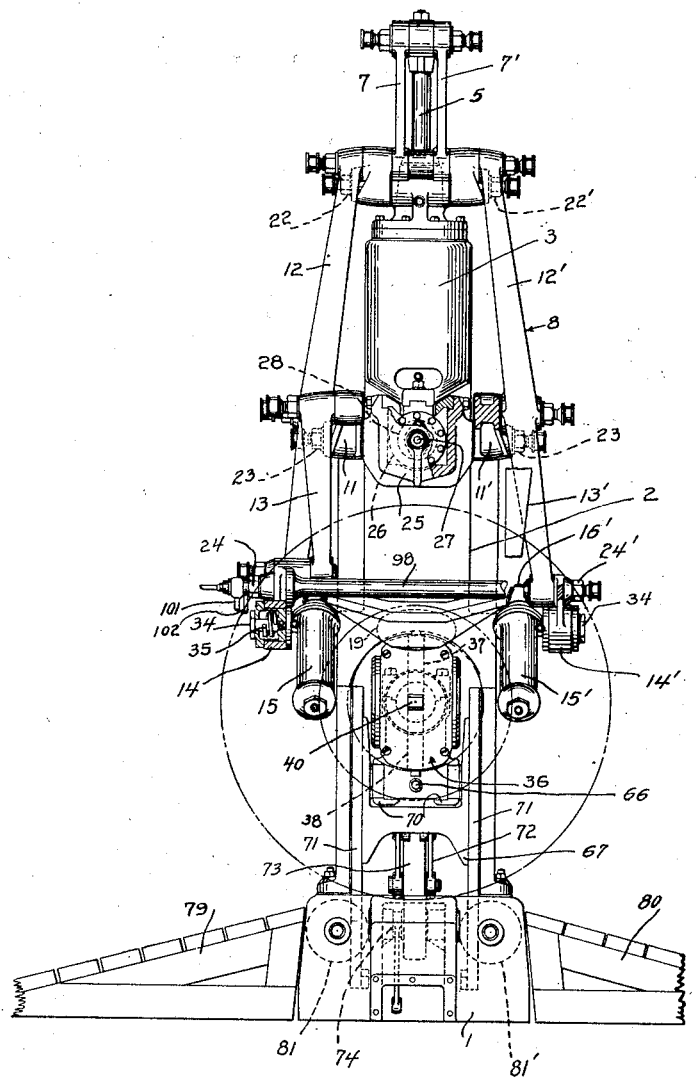

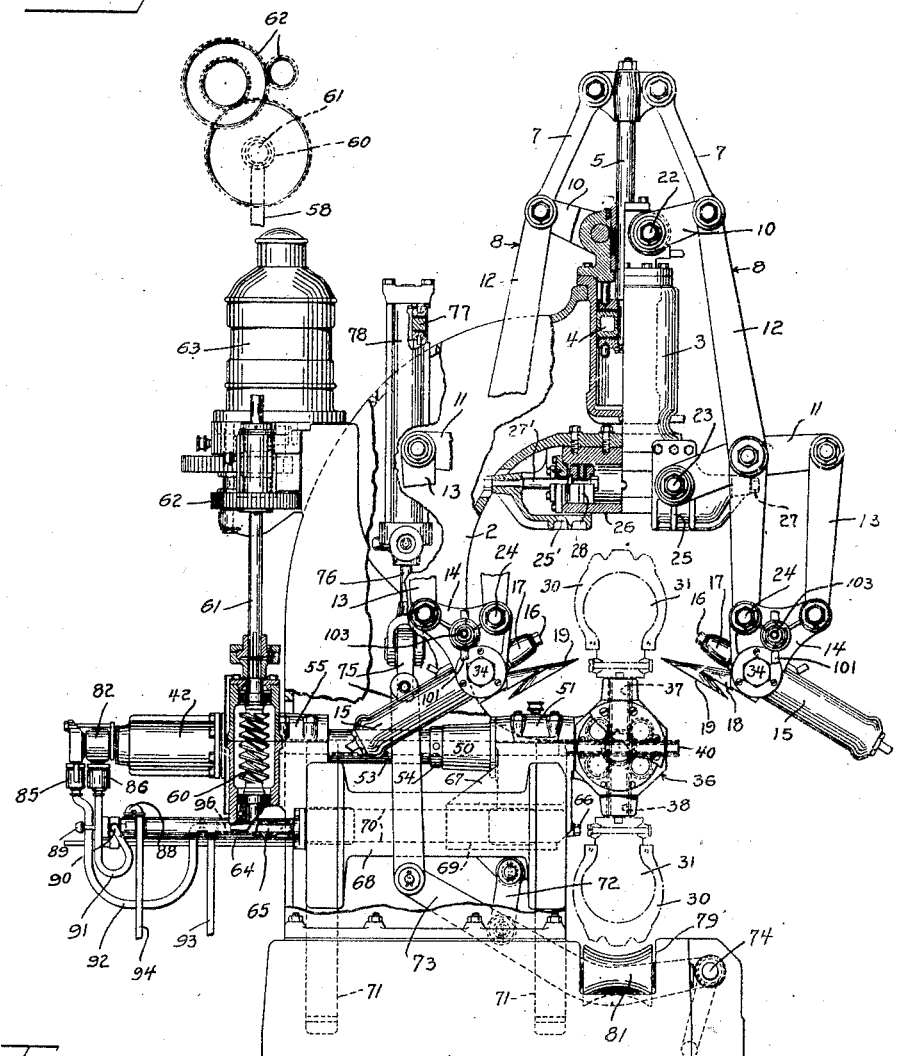

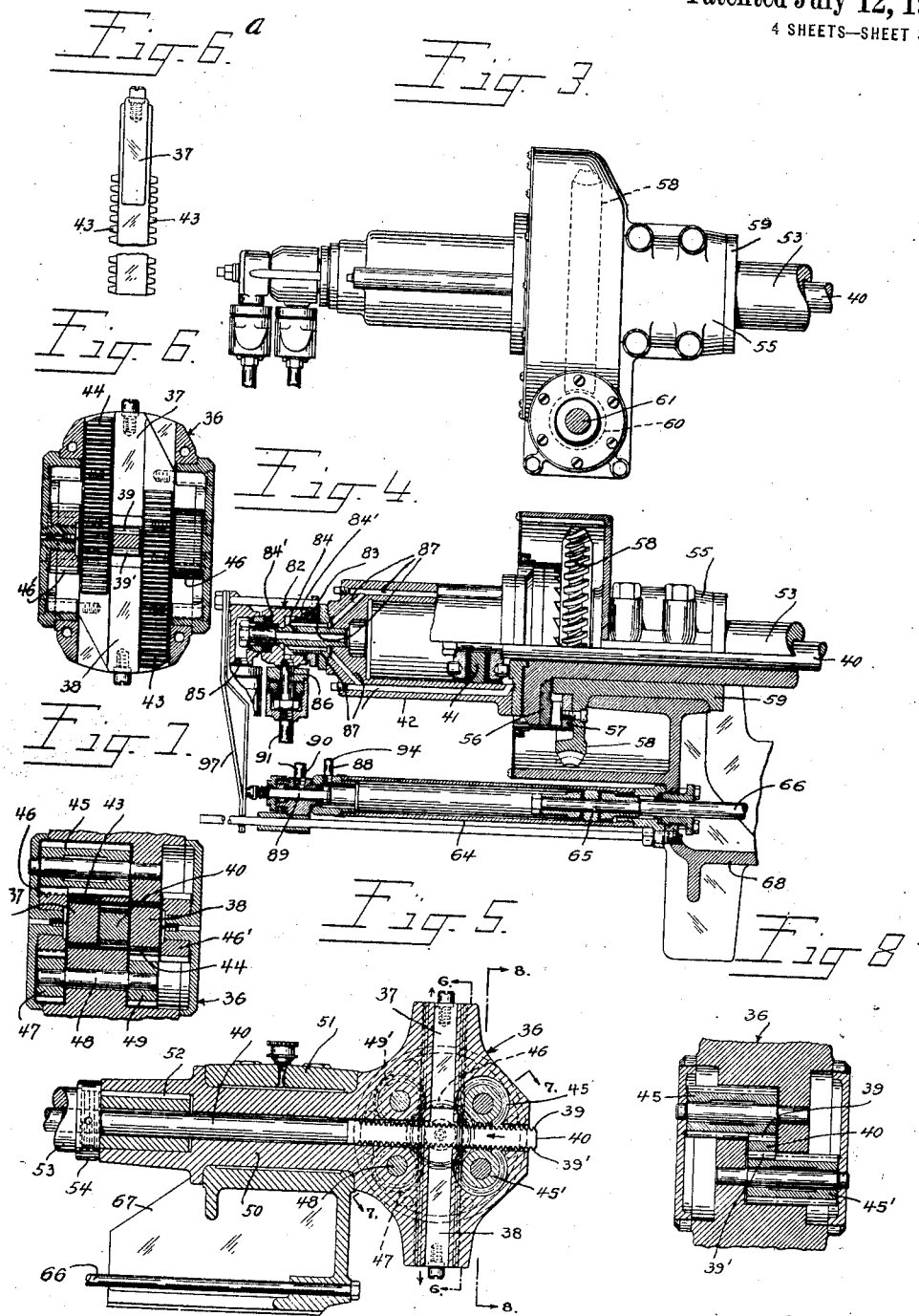

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

TIRE-LOOSENING MACHINE.

1,384,419.         Specification of Letters Patent.     Patented July 12, 1921.

Application filed April 22, 1920. Serial No. 375,792.

*To all whom it may concern:*

Be it known that I, ADRIAN O. ABBOTT, Jr., a citizen of the United States, residing in Detroit, county of Wayne, and State of Michigan, have invented certain new and useful Improvements in Tire-Loosening Machines, of which the following is a full, clear, and exact description.

This invention relates to machines for loosening tires from cores, and particularly inextensible beaded tires. The carcass or shoe of pneumatic tires is made by building up plies of fabric and rubber stock on cores. After assemblage the parts are cured or vulcanized. The combined heat and pressure to which they are subjected during vulcanization causes the casings to tenaciously cling to the core, especially when they have been cemented thereto as is not infrequently the case. Removal of the core as heretofore accomplished manually, has been irksome to the operatives, especially on large sized tires, so much so as at times to leave this particular department of tire manufacture short-handed.

The present invention aims to provide a machine for reducing the labor required to remove tires, and particularly quick detachable and straight sided tires, by loosening the same substantially completely from the cores on which they are built. Thereafter the tires may be removed manually or the cores collapsed without an undue expenditure of energy by an operative. More particularly, it aims to provide a machine that is adapted to handle any size tire, that is efficient in operation saving time and avoiding mutilation of the tire body, that is equally efficient on large and small size tires, and that is durable and substantial in order to withstand the rough usage to which it is necessarily subjected.

Briefly, the machine of the present invention comprises a rotatable chuck holding core which may be raised or lowered to accommodate tires of different sizes and also to locate the tire beads in a certain desirable relation, where with facility opposite pairs of revoluble disks may be inserted between the tire beads and the core and forced outwardly along the sides thereof to points adjacent the tread. Ensuing rotation of the chuck carrying the core will loosen the tire substantially completely and without imposing undue strain upon the embedded wires or other inextensible elements in the bead portions of the tire.

A preferred embodiment of the invention is illustrated in the accompanying drawings, in which—

Figure 1 represents the machine in front elevation;

Fig. 2 is a left hand side elevation partly in section showing a core and tire in dotted lines in operative position on a chuck;

Fig. 2ª illustrates diagrammatically in plan view a reduction gearing between a motor and a core supporting chuck which it drives;

Fig. 3 represents in plan view a detail of a worm gear drive between the motor and chuck;

Fig. 4 is a detail in vertical section of fluid pressure cylinders for operating the chuck arms and the front bearing for the chuck;

Fig. 5 is a vertical cross-section through the core supporting chuck and its head bearing;

Figs. 6, 7 and 8 are sections through the chuck on the lines 6—6, 7—7 and 8—8 respectively of Fig. 5;

Fig. 6ª shows one of the chuck arms;

Fig. 9 is a cross-section through a tire loosening member or disk;

Figs. 10 and 11 illustrate diagrammatically the initial and final positions respectively assumed by the tire loosening disks on their introduction between the sides of a tire and its supporting core;

Fig. 12 is a detail of a tire loosening disk and one of its pair of supporting and actuating plungers and cylinders;

Fig. 13 illustrates in cross-section a detail of piping and ducts between the pairs of cylinders which govern each loosening disk.

In the machine illustrated in the drawings the various parts are supported by a base 1 and a C-shaped frame 2 bolted thereupon. Referring to Figs. 1 and 2, the frame in its upper portion is provided with a cylinder 3 having a piston 4 and rod 5 linked as indicated at 7—7' to opposed pairs of parallel motion linkages indicated generally by the numeral 8. The linkages are each composed of pairs of members 10—10', 11—11', 12—12' and 13—13' which latter pair with members 11—11' oscillatingly support plates 14—14' sustaining cylinders 15—15'. In the last mentioned cylinders are plungers 16—16' which have a beam 17, see Fig. 12, fixed to their upper free ends. Laterally of the beam 17 projects a bracket 18 revolubly supporting a tire loosening member 19, preferably as shown in detail in Fig. 9 in the form of a disk with a beveled edge, and for ease of operation anti-friction bearings 20 may be employed. There is, of course, a second and similarly supported tire loosening member for operation on the opposite side of the tire and core.

Actuation of the linkages 8 causes each of the tire loosening members 19 to move substantially about its core-contacting-edge as a center. The fulcrums 22—22', 23—23' are relatively fixed and thus compel the fulcrum pivots 24—24' of the plates 14—14' to move downwardly in a nearly straight line while links 13—13' operated by the free end of levers 11—11' and turning the plate about the fulcrum pivots 24—24' as a center are moving the core-contacting-edges of the disks upwardly. The net result substantially is a turning movement of the disks from a nearly horizontal to a nearly vertical position by movement about the core contacting edges as a center.

The linkages 8 may be shifted laterally to separate the tire loosening members 19 for facility in introducing and removing cores and insertion of their edges between the tire toes and shoulders of the core on which they rest. This is accomplished by shifting the fulcrum pins 23—23' of each set of linkages through cross heads 25—25' slidable externally on the sides of a cylinder 26 and connected by piston rods 27—27' extending from pistons 28, only one of which is shown, through opposite ends of the cylinder 26.

Relative to the tire 30 and core 31 each of the tire loosening members or disks 19 is therefore movable (1) rectilinearly by fluid pressure actuating pistons in the sets of cylinders 15—15', (2) angularly about its core-contacting-edge as a center through linkages 8 which are actuated by fluid pressure on piston 4 in cylinder 3, and (3) laterally of the core by swinging linkages 8 through fluid pressure on pistons 28 at opposite ends of cylinder 26. These several movements of the loosening members or disks will be clear from a consideration of Figs. 2, 10 and 11.

The sets of cylinders 15—15' are supported by plates 14—14' as shown in Fig. 12, studs 32 projecting laterally therefrom being socketed as indicated at 33 and held by a bolt 34 in such wise that the cylinders normally occupy a given position relative to the plates 14—14'. If desired, however, the tire loosening members or disks 19 may be arranged to shift or yield upwardly to prevent their destruction under excessive strains by introducing a spring 35.

A shouldered core 31 with a tire 30 vulcanized thereon is adapted to be supported on a chuck indicated generally by the numeral 36, (see Figs. 5 to 8 inclusive) and having a pair of arms 37—38 which are adapted to be shifted to and from engagement with sockets in the inner periphery of the core by oppositely disposed racks 39—39' formed on the end of a piston rod 40 fixed to the piston 41 in a cylinder 42. The arms 37—38 are of the angular form construction shown best in Figs. 6 and 6ª, off set to pass on opposite sides of the racks on the end of piston rod 40. Each of the chuck arms 37—38 is provided with racks 43—44 respectively on opposite parallel faces and duplicate trains of gears are housed within the chuck so as to drive the chuck arms 37—38 simultaneously outwardly or inwardly. One of these duplicate sets of gears will be described in detail. It comprises a broad pinion 45 having its teeth in engagement at one end with actuating rack 39, at an intermediate portion with teeth 43 on one side of chuck arm 37, and at the other end with an idler 46 which latter drives a pinion 47 at one end of a stub shaft 48 carrying at its opposite end a second pinion 49, which meshes with teeth 44 on one surface of the other chuck arm 38.

Referring to Fig. 5, when piston rod 40 is shifted in the direction indicated by the arrow broad pinion 45 will be rotated in a clock-wise direction and through the central portion of its teeth, which engage with one of the racks 43, thrust the chuck arm 37 outwardly. At the same time the chuck arm 38 will be thrust outwardly by the gear train 46—47—49 in operative engagement with one of the racks 44 on opposite surfaces of the lower chuck arm.

Through duplicate and oppositely arranged sets of gears indicated by corresponding characters primed, the lower chuck arm 38 is also moved directly by a broad pinion 45' and the upper chuck arm 37 is moved indirectly by a narrow pinion 49'. Thus the chuck arms 37—38 are movable quickly by pairs of gears in engagement with teeth on opposite faces of each.

As there are preferably only two chuck arms 37—38, the chuck may be positioned for receiving the core with its arms vertical so that expansion thereof will first enter one of the arms in the highest socket in the core to lift it from the floor. The core will then center itself for reception of the lower chuck arm.

The hub 50 of the chuck is journaled in a split bearing 51, Fig. 5, and keyed as indicated at 52 to the end of a rotatable hollow shaft 53, provision for adjustment being afforded by a threaded collar 54. Tubular shaft 53 is journaled in a second split bearing 55, Fig. 4, at the rear of the machine and carries a clutch part 56 which is adapted to be shifted relative to an axially immovable clutch part 57 fast to a worm wheel 58 whose sleeve portion 59 is rotatably supported by the split bearing 55. The worm wheel 58 is driven by a worm 60 on the lower end of a vertical shaft 61 connected by a suitable train of reducing gears 62 to a source of power such as a motor 63. When the clutch parts 56—57 are engaged and the motor rotated the chuck 36 is turned at a suitable speed, such for instance as 10 R. P. M.

The chuck is shifted horizontally by fluid pressure in a cylinder 64 operating on a piston 65 which is connected by a rod 66 to a bracket 67 carrying the lower half of the split bearing 51. While the rear bearing 55 for the chuck rotating shaft 53 is fixed on a carriage 68, the supporting bracket 67 of the front bearing 51 is slidably mounted as indicated at 69 on parallel guide bars 70 sustained by the carriage. Through the plunger 65 and rod 66 the chuck may be shifted horizontally from the normal operating position shown in Fig. 2 to a position within the frame of the machine where introduction and removal of the cores is unobstructed. This is a desirable feature of the machine, as it permits the heavy cores to be rolled into position without elevating or canting manually.

The parts are so proportioned and constructed that the shiftable clutch part 56 engages with the non-shiftable and driven clutch part 57 to halt forward movement of the chuck in a position in a plane midway between the loosening disks 19.

To the end that the machine may handle many different sizes and shapes of tires and cores, it is desirable to provide for relative movement between the chuck 36 and tire loosening members 19 so that the disks may be rapidly inserted between the sides of a tire and a core. While either may be moved relative to the other, it is preferred to shift the chuck vertically to the desired elevation and this is accomplished by providing vertical guide bars 71 for the carriage 68 supporting the entire chuck operating mechanism. To the under-side of the carriage 68 is hinged a link 72 which is pinned to a lever 73 fulcrumed at 74 and connected by links 75 to the lower end of a piston rod 76 fixed to a piston 77 in a cylinder 78. By the admission of fluid pressure to the opposite ends of the cylinder 78 the chuck may be raised or lowered to the desired elevation, as required.

The machine is preferably located with platforms or runways 79 and 80 on opposite sides of its base 1 so that a tire on a core may be conveniently rolled into position for mounting on a chuck. Rollers 81—81' are journaled in the front upper surface of the base and afford convenient means for centralizing the core relative to the chuck's path of movement.

The opposite sides of the pistons or plungers in the several cylinders of the machine may be operated by fluid pressure water or air or both, and any suitable and convenient arrangement of pipes and valves may be employed, such for instance as is disclosed in an application by M. Davis, Serial No. 407,077, filed August 31, 1920. No special form of connection is required, but the chuck arm cylinder 42 must be supplied with fluid through a swivel connection 82 to permit rotation of the chuck at one stage. This latter connection 82 turns on the cylindrical exterior 83 of an apertured stud 84 which projects from one end of the cylinder. Suitable gaskets are employed as indicated at 84' to prevent escape of the fluid. The port 85 in the swivel connection is in communication with the aperture in the hollow stud 84 and water may pass therethrough into the front end of the cylinder whose back end is supplied through the port 86 and communicating passages 87. It will be understood that the expression "back of the piston" means that side thereof from which the piston rod extends. The opposite side of the piston will be referred to as "the front of the piston." The ends of the cylinders in which the pistons operate will be likewise distinguished.

In the end of cylinder 64 is a port 88 for supplying and exhausting water from its front end, and the stem 89 of a puppet valve mounted in the end of the cylinder 64 is surrounded by a passage in communication with a port 90. Between port 90 of cylinder 64 and port 86 of cylinder 42 is a flexible connection 91. Flexible coupling 92, see Fig. 2, connects the port 85 of cylinder 42 with piping 93 for supplying and exhausting fluid to and from both the front side of piston 41 and the back side of piston 65. Through the piping 94 water is supplied and exhausted from the front side of piston 65, and thence through puppet valve 89 and connection 91 to the back side of piston 41.

In moving the chuck horizontally forward and in expanding the chuck arms there is a two stage operation as follows: Water is exhausted from the back end of cylinder 64 through the pipes 96—93 and at the same time water under pressure is admitted through the pipe 94 to the front end thereof. The resulting action on piston 65 advances the front bearing 51. This advance continues until halted by engagement of the clutch parts 56—57, and at or just before halting of the chuck's advance, the tappet arm 97 which advances with the chuck opens the puppet valve 89 in the front end of the cylinder 64 and allows the water under pressure in it to pass through the port 90, flexible connection 91, and port 86 and passages 87 to the back side of the piston 41 in the cylinder 42. When the pressure builds up sufficiently, the piston rod 40 and racks at the free end thereof move in the direction of the arrow Fig. 5 and the chuck arms expand.

The reverse operations of the cylinders 42 and 64 after the tire has been loosened from the core are as follows: Water under pressure is admitted through the pipes 93, 92 and port 85 to the front side of the piston 41 and also simultaneously through the branch pipe 96 to the back side of the piston 65. At the same time the water pressure on the back side of the piston 41 is relieved, escaping through the passages 87, port 86, flexible piping 91, port 90, cylinder 64 (where pressure is likewise relieved), port 88, and pipe 94 to a waste line. The effective area of piston 41 being greater than that of piston 65, and the load on it being also less, piston 41 first advances and retracts the chuck arms. The pressure builds up in cylinder 64, however, after the core has been dropped by retraction of the chuck arms onto the rollers 81—81' and thereafter the chuck is drawn back within the frame out of the way by movement of the piston 65 to the front end of the cylinder. The above described two stage operation of the chuck and chuck arms, however, is not essential, as fluid under pressure may be supplied through hand valves to effect the operations in the same or any desired sequence.

While not essential, it is preferred to operate the disks 19 by air and water in the front and back sides respectively of their actuating pistons 16. The necessary separation of the two fluids may be maintained by any suitable devices such as illustrated in Fig. 13 comprising for each set of cylinders 15—15' a hollow spacing tube 98 having its opposite ends secured by nuts 99 in a pair of plates 14—14'; couplings 100 with lateral ports 101 and 102, and an inner tube 103 whose opposite ends are threaded in the couplings. Air supplied to the inner tube may be led through suitable connections to the front sides of cylinder 15—15' while water supplied to the space between the tubes 98 and 103 may be conducted to their back ends.

In starting position, the chuck 36 is retracted within the frame so as not to obstruct the introduction and removal of a core and tire thereon. The core is rolled into position on the centralizing rollers 81—81' and the chuck is then advanced horizontally to a position substantially in a vertical plane midway between the tire loosening members or disks where it is halted by engagement with the clutch members 56—57. At the same time or a little before, through the tappet arm 97 and fluid pressure on the back side of piston 41, the chuck arms are expanded into sockets with which the inner periphery of the core is provided. The chuck carriage 68 is then raised to bring the lower edges of the beads or toes of the tire on a level with the uppermost edges of the disks 19. This is effected by admitting water under pressure to the lower end of cylinder 78 until the desired elevation is reached when the water pressure is shut off and the water sealed beneath the piston. The disks are then brought into contact with the core immediately under the toes or beads of the tire which rest upon a shoulder of the core, as shown. This is effected by admitting water under pressure to the outside ends of the cylinder 26 the space between whose pistons 28 is always in communication with a source of air under a substantially constant pressure. Air is next admitted to the front side of the two sets of pistons 16, while at the same time water pressure on the opposite sides of all these pistons is relieved. This results in lowering the linkages 8 from a nearly horizontal to a nearly vertical position. In the first part of the action the disks move about their core-contacting-edges as a center, but as they approach a vertical position the compressed air on the front sides of the pistons 16 causes the disks to force their way up between the sides of the tire and the core. As the action progresses still further, and when the upper extremities of the disks are about to encounter the undercut portion of the core, it is desirable, in some cases at least, to spread the disks slightly and avoid blunting their edges against the swell in the sides of the core. This may be effected by momentarily relieving the water pressure on the back or upper sides of the opposed pistons in the cylinder 26 thereby allowing the compressed air between the pistons to shift the disks laterally of the core. This pulling upon the sides of the tire is usually so efficacious that the disks shift rapidly around the swell in the core to a full loosening position adjacent the tread which is diagrammatically illustrated in Fig. 11. The motor 63 is then operated to rotate the chuck and complete the loosening of the tire from the core throughout its circumference. Only one revolution of the chuck is necessary. The parts of the machine are then restored to starting position by repeating the operations in the reverse order.

The foregoing detailed description relates to a preferred form of construction but obviously many changes may be made in the detailed construction without departing from the spirit of my invention and accordingly reference should be made to the accompanying claims for an understanding of its scope.

Having thus described my invention, what I claim and desire to secure by Letters Patent is:—

1. Apparatus for loosening tires from cores, including, in combination, a core support, tire loosening members, independent means supporting said members in spaced relation for operation on opposite sides of a core, means for inserting said members between a tire and its supporting core, and means for bodily moving the tire support and said members relative to one another to loosen a tire from a core.

2. Apparatus for loosening tires from cores including, in combination, a core support, tire loosening members, independent pivotal supports for said members spaced apart on opposite sides of the core, means for inserting said members into a loosening position between a tire and core, and means for relatively moving the core support and members to loosen a tire from a core circumferentially.

3. Apparatus for loosening tires from cores including, in combination, a core support located internally of the core, tire loosening members operatively supported on opposite sides of said core, means for inserting said members between the tire and its core, and means for bodily moving the tire and members relative to one another to loosen a tire from a core.

4. Apparatus for loosening tires from cores including, in combination, a core support, revoluble tire loosening members, articulated supports for each of said members on opposite sides of the core, and means for bodily moving the core supporting members relative to one another to loosen a tire from its core.

5. Apparatus for loosening tires from cores including, in combination, a core support, tire loosening members, shiftable articulated supports for each of said members on opposite sides of the plane of the core, and means for moving the core support and members relative to one another to loosen a tire circumferentially from a core.

6. Apparatus for loosening tires from cores including, in combination, a core support, tire loosening members, shiftable pivoted supports for each of said members on opposite sides of the core, means for introducing the members between the sides of a tire and its core, and means for moving the core support and members relatively to completely loosen both sides of a tire from a core.

7. Apparatus for loosening tires from cores including, in combination, a core support, tire loosening members, means for inserting said members between the sides of a tire and its core, and means for angularly moving the core support and members relative to one another to loosen a tire from its core, said core support being adjustable in the plane of its body for location of the bead portions of different size tires in a position suitable for insertion of the loosening members.

8. Apparatus for loosening tires from cores including, in combination, a core support, revoluble tire loosening members, bodily insertible between a core and the sides of a tire thereon to a point beyond the region of the tire's beads, means for supporting and actuating the tire loosening members, and means for moving the core support and members relative to one another to loosen a tire from a core.

9. Apparatus for loosening tires from cores including, in combination, a core support, a revoluble tire loosening member, bodily insertible between a core and a side of a tire thereon to a point beyond the region of a bead, means for operatively supporting the member, and means for moving the core support and member relative to one another to loosen a side of a tire from a core.

10. Apparatus for loosening tires from cores including, in combination, a core support, rotatable loosening disks, means for supporting and actuating the disks, and means for moving the core support and disks relative to one another to loosen a tire circumferentially from a core.

11. Apparatus for loosening tires from cores including, in combination, a core support, revoluble tire loosening disks with beveled edges, independent means for supporting said disks at opposite sides of the core, and means for moving the core support and disks relative to one another to loosen the sides of a tire from its core.

12. Apparatus for loosening tires from cores including, in combination, a core support, tire loosening members, articulated supporting connections for each of said members at opposite sides of the core, and means for inserting said members between the sides of a tire and its supporting core including mechanism for shifting the members at a substantial angle to the plane of the core, and means for moving the core support and members relative to one another to loosen the tire circumferentially from its core.

13. Apparatus for loosening tires from cores including, in combination, a core support, revoluble tire loosening members, fluid pressure operable means for insertig the members between the sides of a tire and its core, means for governing the operation of said last named means whereby movement of the members past the undercut portion of the core may be accomplished without contact therewith, and means for rotating the core support to loosen a tire circumferentially from its core.

14. Apparatus for loosening tires from cores including, in combination, an internal core support, means for rotating the same, tire loosening members, and means for inserting the same between the sides of a tire and its core.

15. Apparatus for loosening tires from cores including, in combination, a core supporting chuck, means for rotating the chuck, a shiftable chuck supporting carriage, tire loosening members, and means operatively supporting and actuating said tire loosening members to loosen a tire from its core.

16. Apparatus for loosening tires from cores including, in combination, a core supporting chuck, means for rotating the chuck, shiftable means supporting said chuck and permitting displacement thereof from a normal operative position to a non-obstructing position facilitating the introduction and removal of a core, tire loosening members, and means for inserting the tire loosening members between a core and tire vulcanized thereon and loosening the same circumferentially.

17. Apparatus for loosening tires from cores including, in combination, a core supporting chuck having a plurality of shiftable arms, means for moving said arms, means for rotating said chuck, tire loosening members, and means for moving said members to a loosening position between a core and the sides of a tire thereon.

18. Apparatus for loosening tires from cores including, in combination, a core supporting chuck, means for rotating the chuck, means for shifting the chuck in two directions, tire loosening members, and means for supporting and actuating said members to loosen a tire from a core.

19. Apparatus for loosening tires from cores including, in combination, a core supporting chuck, tire loosening members, and means for supporting and actuating said loosening members including a plurality of links about the pivot of one of which each member may be swung in a curved path.

20. Apparatus for loosening tires from cores including, in combination, a core support, tire loosening members, means for supporting and actuating said tire loosening members including a plurality of fluid operable cylinders, and means for rotating the core support to loosen a tire from a core between the sides of which the members have been inserted.

21. Apparatus for loosening tires from cores including, in combination, means for supporting and rotating a core, tire loosening members, plungers fixed to and supporting said members, cylinders, coöperating with said plungers and articulatively supported by a plurality of links, and means for operating said links and said plungers to move the loosening members into tangential relation with a core whereby the sides of a tire thereon may be loosened.

22. Apparatus for loosening tires from cores including, in combination, a core supporting chuck, means for rotating the same, tire loosening members, means revolubly supporting said members, a plurality of plungers rigidly connected to said last named means on opposite sides of the axis of revolution of each tire loosening member, cylinders coöperating with said plungers, a plate sustaining each of said cylinders, a plurality of links connected to each of said plates at spaced points, means for actuating said links and plates to swing the loosening members in a curved path, and fluid pressure means for moving said plungers whereby the loosening members may be inserted between the sides of a tire and a core.

23. Apparatus for loosening tires from cores including in combination, means for supporting a core having a tire which has been vulcanized thereon, tire loosening members, and means operable entirely by power for separating the sides of the tire from the core around substantially the entire circumference thereof.

24. Apparatus for loosening tires from cores including in combination, means for supporting a core having a tire which has been vulcanized thereon, a tire loosening member operatively supported above the core, and means for rotating the means for supporting the core to separate the sides of the tire from the core around substantially the entire circumference thereof.

Signed at Detroit, Mich., this 14th day of April, 1920.

ADRIAN O. ABBOTT, Jr.